United States Patent [19]

Bryll

[11] 4,189,708
[45] Feb. 19, 1980

[54] METHOD AND APPARATUS FOR CONTROLLING ACCESS TO A FACILITY

[75] Inventor: Medard Z. Bryll, Palos Park, Ill.

[73] Assignee: Gateway Industries, Inc.,, Chicago, Ill.

[21] Appl. No.: 790,597

[22] Filed: Apr. 25, 1977

[51] Int. Cl.² ............... B60R 25/04; G01G 19/08; G01G 19/44

[52] U.S. Cl. ............... 340/64; 177/136; 177/142; 180/114; 235/91 L; 307/10 AT; 340/542; 340/666

[58] Field of Search ........... 340/64, 272, 274, 280, 340/545, 549, 666, 686, 542; 307/10 AT; 180/114; 70/262, 263, 277, 279, 280; 177/1, 50, 136, 142, 245, 137; 235/91 L, 92 WT

[56] References Cited

U.S. PATENT DOCUMENTS

| | | | |
|---|---|---|---|
| 3,167,142 | 1/1965 | Meneely | 177/137 |
| 3,538,501 | 11/1970 | Nance | 340/164 |
| 3,611,287 | 10/1971 | Hoff | 340/63 |
| 3,691,396 | 9/1972 | Hinrichs | 307/40 |
| 3,750,158 | 7/1973 | Anastassakis | 340/272 |
| 3,790,933 | 2/1974 | Cort | 340/63 |

Primary Examiner—John W. Caldwell, Sr.
Assistant Examiner—Joseph E. Nowicki
Attorney, Agent, or Firm—Fitch, Even & Tabin

[57] ABSTRACT

The system denies unauthorized access to a locked facility by a person having a weight characteristic differing from that of the weight characteristic of the person locking a facility such as an automotive ignition system. The system comprises a method and apparatus which may be selectively activated to measure a deflection caused by a person seated in the vehicle's driver seat. The deflection is a weight information which is stored. A person subsequently seated in the vehicle seat and attempting to operate the igniton causes a second measuring operation and a comparison of the newly measured weight information with the stored information to test for a substantial parity therebetween. A substantial parity of these weights allows operation of the starting motor of a vehicle. A disparity between the weights operates a timer and/or alarm means while disabling the vehicle starter motor. The system may be used to control access to various other kinds of locked facilities such as locked rooms or buildings.

5 Claims, 9 Drawing Figures

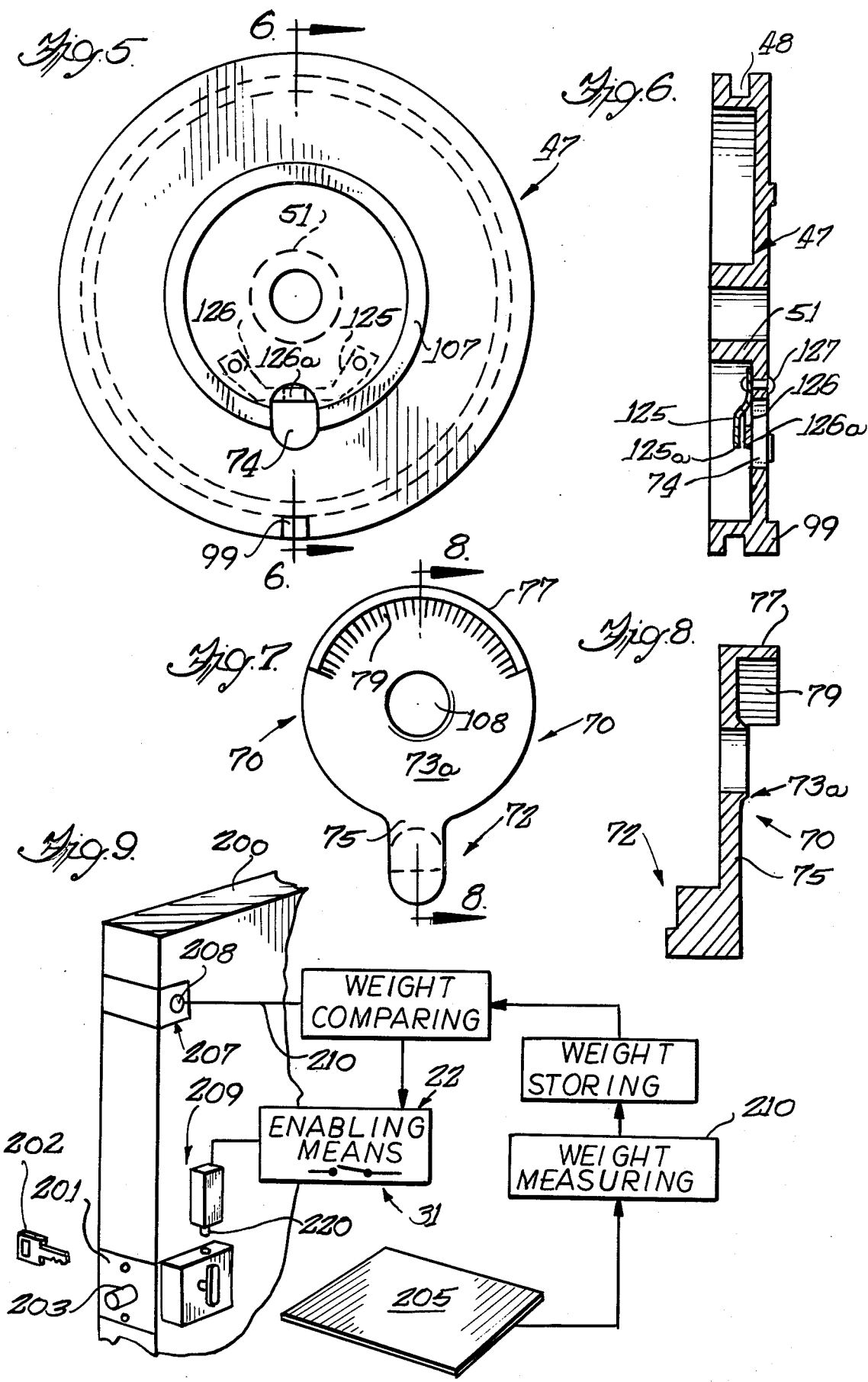

METHOD AND APPARATUS FOR CONTROLLING ACCESS TO A FACILITY

This invention relates to a method and apparatus for thwarting unauthorized access to or use of a facility such as a vehicle, a structure or the like.

The present invention is directed to thwarting theft of a vehicle or entry to a structural space through a locked door. The system is highly personalized or individualized to the person who activates it and will thwart entry by others during initiator's absence even though the other person may have a key, a lock-picking device, a lock-jumping device for the conventional ignition or door lock. The system will be discussed hereinafter in detail in reference to an automotive vehicle although the system has other uses most of which will not be described in detail herein.

A wide assortment of devices and systems have been proposed for preventing the theft of vehicles. Usually such devices are directed to an improved ignition lock having various safeguards against picking the lock or shortcircuiting the ignition contacts operable by the ignition key and lock. Often by forcing a screwdriver or other tool through the lock a thief is able to circumvent the lock and the entire system fails.

Still other systems have been proposed which require the driver to remember a predetermined sequence of numbers and to operate a digital keyboard or to turn a knob to provide the predetermined numerical sequence. People often forget a sequence of numbers, particularly if there are more than three numbers involved. It has been suggested that the system be programmed with the owner's date of birth, which can be discovered by the thief accessing present day computer bank systems which contain such information therein. In any event, such programming of the devices is costly and provides a very limited number of variables for the thief to overcome. Finally, original equipment manufacturers of automobiles have not installed such antitheft systems because they generally have not either been sufficiently foolproof or sufficiently low in cost.

Other systems are such that a common tool may be made to defeat all systems, whereas, this invention operates only on the physical characteristics of the individual, and does not require any additional devices, such as keys, with which to operate it. In other words, it is completely passive.

With the increasing cost of vehicles and the increasing theft by professional thieves, there is a need for a relatively low cost antitheft system for vehicles. The same ned to deny access to thieves to homes or apartments by picking door locks is also very evident.

With the present invention, there is no need to preprogram the antitheft system with the user's birthdate or other reference numbers which must be then matched by the person desiring access. More specifically, with the present invention applied to automobiles, the system is programmed to a reference characteristic by the amount of seat deflection by the vehicle driver at the time he initiates operation of the antitheft system. The area of contact of initiator's buttocks with the seat as well as his weight provides a deflection which is uniquely his own. That is, two persons may be of the same weight but have different buttock widths and deflect the seat different amounts. Thus, even knowing the driver's weight should not suffice for a thief. This reference characteristic of seat deflection is of course basically a modified "weight information" measurement which can be stored and then later compared with a similar weight information by another subsequently seeking to start the vehicle. Preferably, the system is such that the potential thief has only one chance to operate the ignition lock while providing a weight information measurement after which it is not possible to start the vehicle for a predetermined length of time. Such a weight information will be difficult for a thief to duplicate with only one or very few chances. On the other hand, when the person who initiated the antitheft system returns to the driver seat and turns the ignition, his newly measured weight information will match his previously stored weight information causing an operation of an enabling means thereby allowing the ignition key to operate the starting motor for the vehicle's internal combustion engine.

It is contemplated that the automotive vehicle should not be rendered inoperative by the system for extremely long periods of time because situations often develop where the automotive vehicle needs to be used by other authorized persons because of a change in plans. In such cases, another authorized person of a different width may desire to use the vehicle. To allow for such usage by others while still thwarting car thieves, the antitheft system may be provided with a timing device requiring the driver to wait a predetermined and an inordinately long period of time before the ignition system and starting motor are enabled for operation by the usual ignition key.

Those experienced in antitheft matters are generally in agreement that the professional car thief is able to circumvent conventional locks and ignition systems in about two minutes or less which usually is insufficient time for the thieft to be observed and apprehended. It is the judgment of those expert in antitheft systems, that if the thief cannot bypass the antitheft or ignition systems within five minutes that the thief usually becomes discouraged and will abandon the theft. Thus, in the preferred embodiment of the invention, the system is provided with a weight-information sensing and matching system, as well as a timing system which allows others having an ignition key to start the vehicle's internal combustion engine after a predetermined wait, for example, at least five minutes. Manifestly, the timing means may be settable for much longer periods of time or the timing means may be "shut off" when the initiator wants the access limited to himself only.

In accordance with a further embodiment of the invention, the weight-information sensing and matching system may be connected to an audio alarm rather than the ignition system and may be used to sound an audio alarm when a thief sits in the vehicle and his weight information differs from that of the person setting the system. The use of audio alarms is fairly widespread and the weight sensing, storing and matching system of the present invention could be used to operate the audio alarm when the driver's weight information does not match the stored weight information.

Accordingly, a general object of the invention is to provide a new and improved authorized access for usage in a method and system personalized to a person's weight characteristic.

A more specific object of the invention is to provide a new and improved antitheft system for vehicles personalized to a person's physical shape and weight when sitting in the driver's seat.

Other objects and advantages will become apparent from the following detailed description taken in connection with the accompanying drawings in which:

FIG. 5 is an elevational view of the reel.

FIG. 6 is a cross-sectional view taken along the line 6—6 of FIG. 5.

FIG. 7 is an elevational view of a sensing element.

FIG. 8 is a cross-sectional view taken substantially along the line 8—8 of FIG. 7.

FIG. 9 is a diagrammatic view of the invention used to thwart access through a door.

Figure 1:
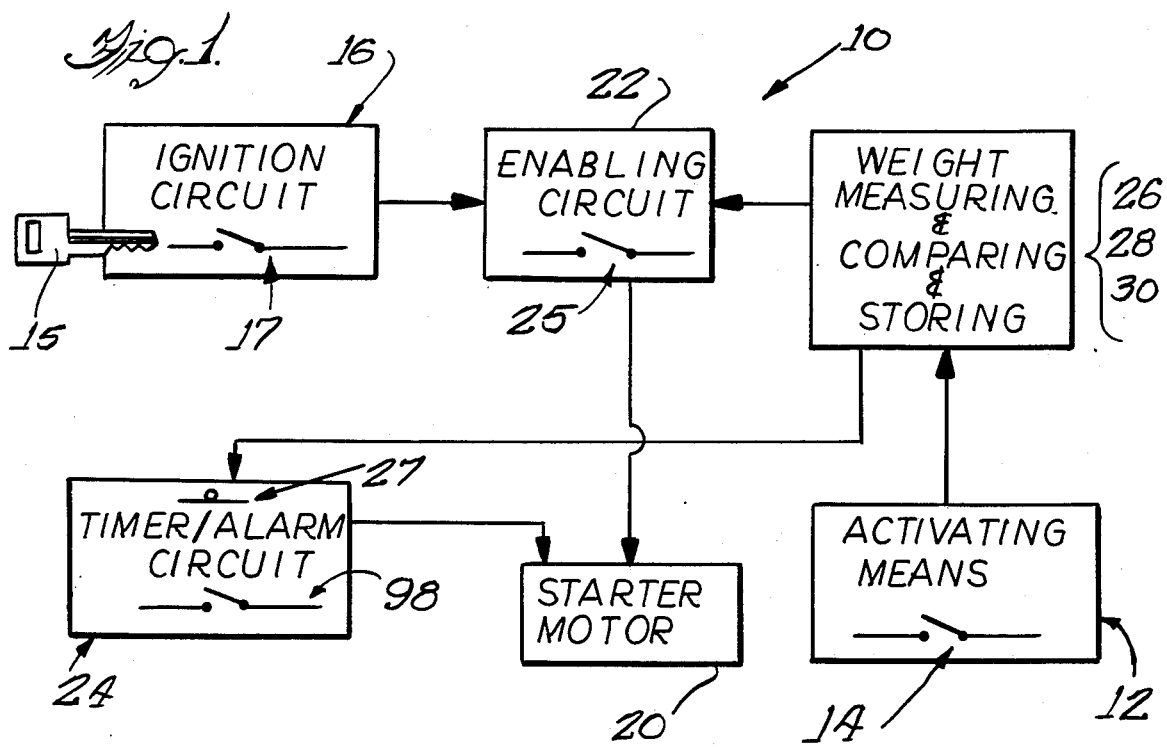
FIG. 1 is a diagrammatic illustration of the functional operation of the method practicing the preferred embodiment of the invention.

As shown in the drawings for purposes of illustration, the invention is embodied in an authorized access system 10 which is applicable to denying access to unauthorized persons to use a facility such as an automotive vehicle or access to a facility such as a locked room or apartment. Hereinafter, the system 10 will be called an "antitheft" system to denote its preferred usage to stop automobile thefts. In a vehicle such as an automobile, the driver will be seated in the driver's seat behind the steering wheel and will operate an activating means 12 to set the antitheft system into operation. The preferred activating means 12 includes a manually operated device or switch 14 thrown by the driver prior to his leaving the vehicle. It is possible that the activating system 12 may be automatically set when the driver turns off the ignition and leaves the vehicle. A manually operated switch 14 is preferred as usually it is desired to activate the system only when the vehicle is parked in an area in which it may be stolen or when the vehicle will be unattended for a considerable period of time. Having activated the system, the driver will turn the ignition key 15 to "off" opening the ignition circuit 16 and then remove the key and leave the vehicle.

The antitheft system 10 is highly personalized to the driver who activated the system in that even though the ignition circuit is later operated by a key 15 or is bypassed as by "jumping" the ignition lock, the circuit to the starting motor 20 for the internal combustion engine will remain open at an enabling means 22 which was set in the open circuit condition at the time of the activation of the antitheft system. Therefore, even if a thief closes or jumps the ignition circuit means 16, the starter motor 20 will not operate as it is disabled by enabling means 22, e.g., as by having an open circuit contact 25 therein. As will be explained in greater detail, a timing and/or alarm means 24 may be provided to allow other members of the family or authorized persons who have keys to use the vehicle only after they wait out the predetermined period of time, e.g., 5 or 10 minutes, as provided by the timing means 24. The timing means may also have connected thereto an audio alarm which operates for the waiting period of five minutes. Of course, thieves are generally reluctant to sit in a vehicle for an extended and unknown period of time particularly if an audio alarm is sounding because they may be observed and apprehended. In accordance with a further embodiment of the invention, the audio alarm 27 may be sounded only with the timer having been eliminated so that the vehicle still may not be operated after a waiting period except by a person who deflects the seat to the proper degree.

The antitheft system 10 preferably comprises a weight information measuring means 26 which measures the weight of the driver preferably by seat deflection and stores the weight information in a memory or weight storing means 28. This stored weight information remains the reference which must be substantially matched during a subsequent occupation of the driver's seat. As explained above, the seat deflection is not a pure weight measurement as the physiognomy of the driver's buttocks also is a factor in the amount of seat deflection. For instance, a man and a women may weigh approximately the same, but their physiognomies may differ so substantially that the seat deflection being measured may vary appreciably. Thus, the "weight information" is highly personalized and not easily duplicated by thieves having information about the driver's weight. Each person who sits in the driver's seat has the seat deflection measured by the weight measuring means 26 and this newly measured weight information is compared by a matching or weight information comparing means such as upon operation of the ignition means 16 as by use of the key 15. If the stored weight information is substantially matched by or in parity with the weight information of the person in the driver's seat, the weight comparing means 30 operates the enabling means 22 to close the open circuit switch means 25 so that the starter motor 20 may be operated. In the preferred system, the thief is given only one opportunity to have his weight information tested against the stored weight information so that the thief cannot try to adjust or vary his weight information gradually to try to obtain the referenced weight information on a momentary basis. To this end, as will be explained in greater detail, operation of the ignition key causes a weight comparing operation by the weight comparing means 30 and, a failure to match weights causes another operation to ensue. The preferred ensuing operation is to operate the timing and/or alarm means 24 which prevents operation of the starter motor 20 until expiration of the timing period. The timing period may be adjustable by the initiator to be a very long period, e.g., overnight or about six hours, rather than the usual five or ten minutes and an audio alarm 27 may be activated for that period of time.

Figure 2:
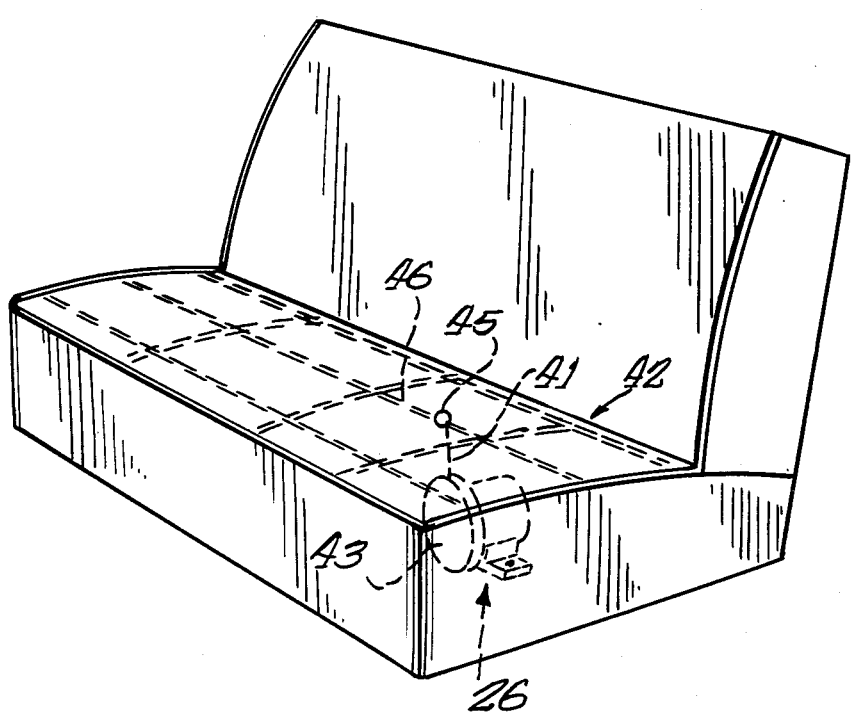
FIG. 2 illustrates a seat having a deflection-sensing means implanted therein in accordance with the preferred embodiment of the invention.

Referring now in detail to the preferred embodiment of the invention, and in particular to FIG. 2, the preferred weight measuring means 26 comprises an extensible seat follower 41 which is connected to a portion 42 of a seat at one end while its other end is connected to the vehicle for displacement with deflection of the seat portion 42. Alternatively, the other end of the extensible follower 41 may be connected to the vehicle structure or to another portion of the seat. The elongated seat follower 41 is preferably a cable like member such as core which is coiled on a rotatable drum or reel 43 with the elongated follower 41 being coiled upon the reel 43 upon downward deflection of the seat portion 42 and with the follower being payed out from the reel 43 upon upward movement of the seat portion 42 as a person leaves the vehicle. The illustrated follower has its upper end fastened by a clip 45 to a spring 46 of the seat portion 42 immediately opposite the steering wheel.

The reel 43 is secured to a stationary portion of the vehicle or another portion of the seat.

Figure 3:
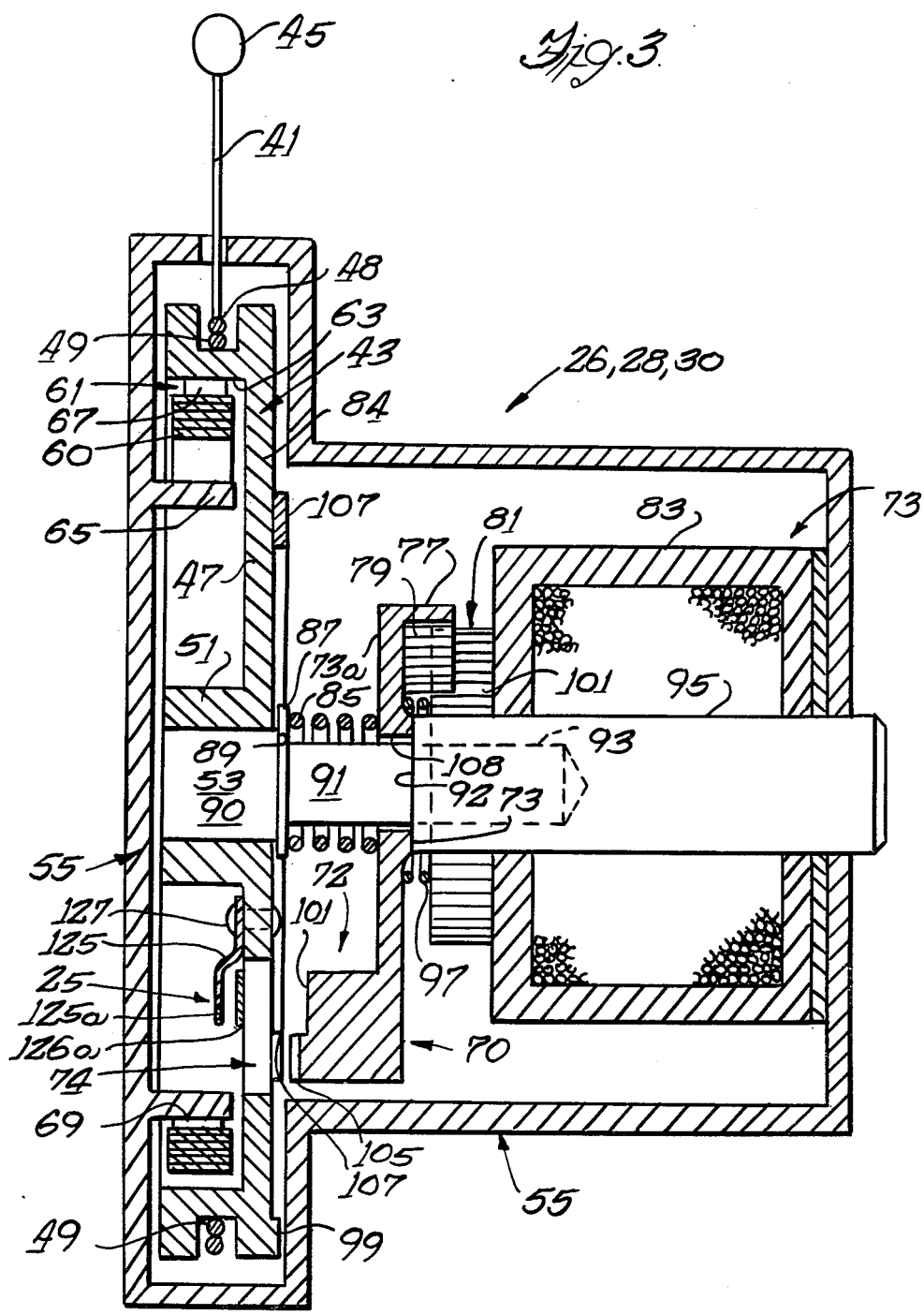
FIG. 3 is an enlarged cross-sectional view of the deflection-sensing, storing and comparing device constructed in accordance with the preferred embodiment of the invention.

The preferred reel 43 is a generally disc-shaped body 47, as best seen in FIGS. 3, 5 and 6, with an outer circular surface having a circumferential groove 48 into which are wound several turns or coils 49 of the elongated follower 41, the latter preferably being a cord or wire cable-like member which is inexpensive and capable of long and repetitive use in a vehicle. The preferred reel body 47 is formed of molded plastic and is formed with an internal hollowed central hub 51 mounted for turning about an axis of a supporting axle means 53 of a fixed housing or fixed stationary support 55. The reel 43 is biased to wind the seat follower 41 by a biasing means in the form of a spiral clock spring 60 which is disposed in an annular cavity 61 formed between an outer circumferentially extending wall 63 in the reel body 47 encircling an inner circumferentially extending wall 65 on the stationary base 55. One end of the clock spring is fixedly connected to a molded lug 67 on the reel body 47 to impart turning torque to turn the reel body 47 and the clock spring's other end is suitably attached to a molded lug 69 on the stationary base 55. The reel is biased to turn counterclockwise, as viewed in FIG. 4.

The preferred weight measuring means does not need an initial exact reference height or position relative to the frame of the vehicle; and hence is operative and accurate despite seat sagging or other conditions arising after considerable use and compression of seat springs. The upper position of the seat spring 46 when the seat is unoccupied defines a reset or zero position from which subsequent deflections are measured. The weight of a person in the driver seat deflects the seat spring 46 allowing the reel spring 60 to wind the downwardly displaced portion of the elongated cable 41 onto the reel 43 and concurrently the reel body 47 turns through a given rotational increment depending upon the amount of cable 41 displaced downwardly with seat deflection.

The weight storing means 28 preferably registers the displacement of the cable 41 or angular turning movement of the reel body 47. The preferred weight storing means comprises a sensing element 70 which is clutched to the reel body 47 to turn with the reel body through a given angular turning movement for a given weight and then the sensing element is declutched from the reel body and maintained in its angular position indicative of the stored weight.

The illustrated sensing element 70, as best seen in FIGS. 3, 7 and 8, is provided with at least one sensing finger or lug 72 which is projected into an opening 74 in the reel body 47 to clutch the sensing element 70 to be driven by the reel during its rotation so long as the finger 72 is inserted into the opening 74 in the reel body 47. As will be explained, the sensing element 70 may be moved axially to remove its finger 72 from the opening 74 and hence be declutched from the reel body 47 which may undergo many turning movements without disturbing the position of the sensing element 70 which is storing the weight information by its angular position.

A sensing element 70 is of generally disc-shape with a central flat body section 73a having a radially outwardly extending appendage 75 carrying the axially extending sensing finger 72. Projecting in the opposite direction and disposed on the opposite side of the disc-shaped body 73 is a detent element 77 preferably in the form of a sector-shaped element having an arcuate serrated surface 79 facing inwardly for detenting engagement with a serrated locking ring 81 secured to a cylindrical wall of a solenoid housing 83. The solenoid housing 83 is carried by and fixed to the housing 55. The detent element 77 and the serrated arcuate ring 81 constitute a detent or locking means for detenting the sensing element in a declutched and weight storing position. The detent means will lock and hold the sensing finger 72 at its given angular position to store the weight information until such time as the solenoid means 73 is operated to attempt to match the weight information stored with the newly sensed and stored weight information.

More specifically, the sensing element 70 is adapted to be shifted axially to either abut its sensing finger 72 against a grounding ring on the wall 84 of the reel or to insert the sensing finger 72 into the opening 74 in the reel body because of alignment of the finger and opening signifying a parity of the weight information. As best seen in FIG. 3, the sensing element 70 is biased from the reel 43 to its declutched position by a coiled compression spring 85 having one end abutted against a washer 87 mounted on the stationary boss 53 of the housing 55 at a shoulder 89 between a large diameter section 90 carrying the reel body from the smaller diameter section 91 of the boss 53. The latter projects into a coaxial bore 93 formed in the solenoid plunger 95 of the solenoid means. The solenoid plunger 95 is shifted axially along the axis of the reel toward the reel, to the left as viewed in FIG. 3, when the solenoid coil is energized to sense for the opening 74. If the sensing finger 72 is angularly positioned at the same angular location as the opening 74, the sensing finger 72 is able to move into and through the opening 74 to abut its offset contact actuating face 101 with the contact means 25 in the reel 43 to operate later whereby the enabling means is operated to allow starting of the vehicle.

If the stored weight information is not being matched, an outer ground contact 105 on the sensing finger 72 is shifted axially to abut the grounding ring 107 which extends about the reel wall 83 except for a discontinuation therein at the opening 74. Thus, in any position except for the insertion of the ground contact 105 into and through the opening 74, the ground contact 105 will abut the grounding ring 107 and a "timer and/or alarm set" condition is made which results in the timer and/or alarm means 24 being operated.

Figure 4:
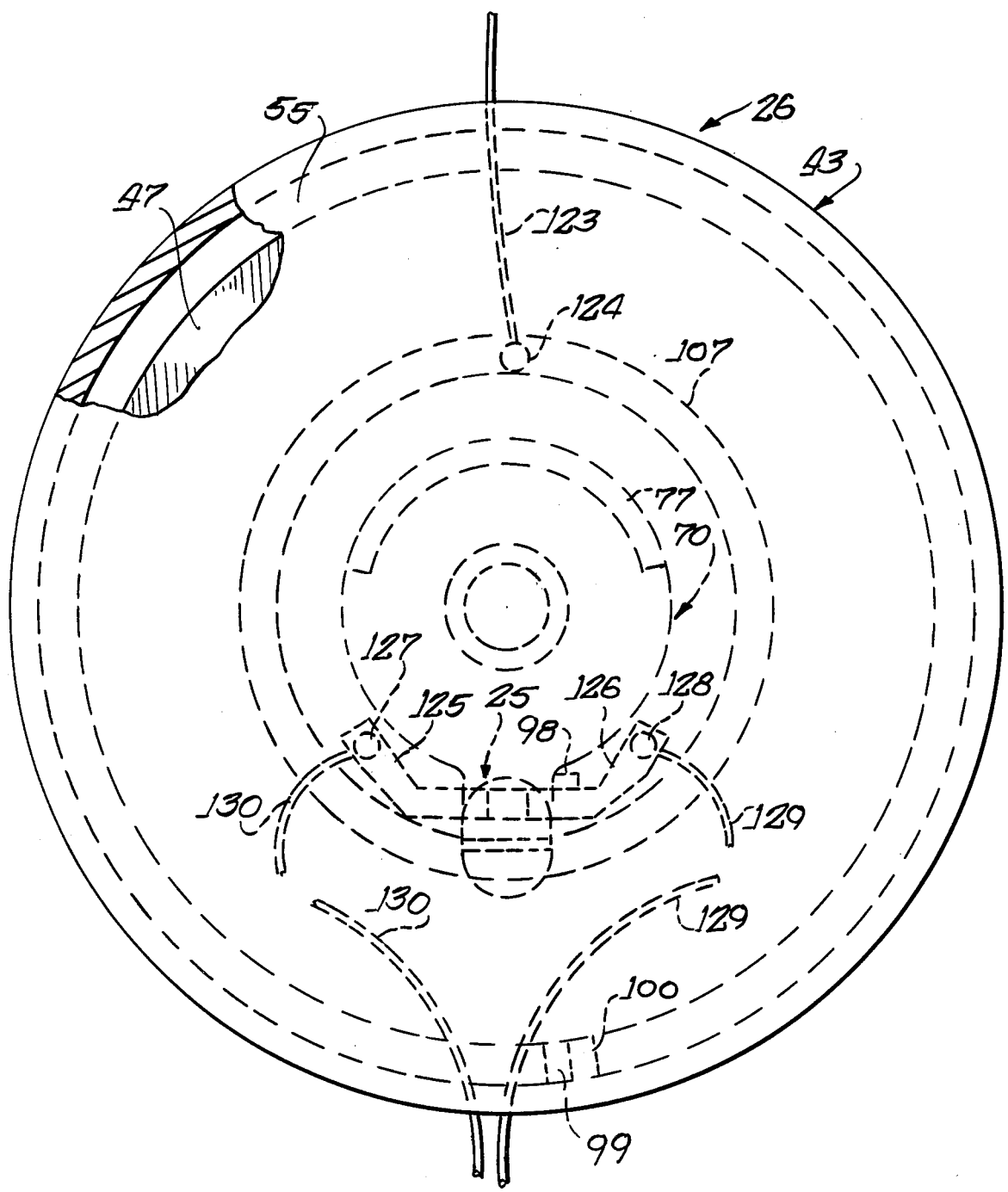
FIG. 4 is an elevational view of the device of FIG. 3.

At the time of a "timer set" condition in which the sensing finger 72 fails to insert into the opening 74, the sensing element is automatically released from its detented position and is allowed to reset to a zero position. Herein, the sensing element 70 is biased to turn about the boss portion 91 to the reset position by a torsion spring 97 (FIG. 3) which has one end fixed to the sensing element 70 and has its opposite end fixed to the stationary serrated ring 81. The separation of the detent serrations 79 on the sensing finger 72 from the serrations 101 on the detent ring 81 is achieved by cocking the sensing element to lift and shift axially leftward its serrations. More specifically, one end wall 92 on the solenoid plunger 95 abuts the circular wall 73 of the sensing element and pushes the same without tilting along the boss portion 91 while further compressing the return spring 85 to bring the contact 105 on the sensing finger 72 to abut the grounding ring 107. The central opening 108 in the sensing element is larger in diameter than the diameter of the inserted boss portion 91 to allow tilting as well as rotation of the sensing element on this boss portion. As the solenoid plunger 95 continues to push the finger 70 to the left, as viewed in FIG. 3, the sensing element begins to pivot about contact 105 raising the inner detent serrations 79 from the serrations 101 and shifting the entire detent segment to the left of the detent ring until the respective serrations separate. This separation immediately allows the torsion spring 97 to twist and turn the sensing element 70 to its zero or reset position. As best seen in FIG. 4, a projecting boss 98 on the stationary cover is abutted by the sensing finger 72 when the latter is in its reset position. In this embodiment of the invention, the movement of the sensing element 70 is limited to just slightly less than 360° by the stationary stop. This is sufficient to sense seat deflection by very heavy persons. The reel 43 is also limited to this same degree of turning and is located at the zero and reset position by engagement of projection 99 on the reel abutting a projection stationary stop 100 on the housing 55. This locates the reel opening 74 opposite and in alignment with the sensing finger 72.

As best seen in FIG. 4, the grounding ring 107 has a first lead 123 connected thereto which has a brush contact 124 with the contact ring 107. Herein, the contact means 25 is comprised of a pair of normally open leaf spring contact strips 125 and 126 having overlapping end portions 125A and 126A which are spaced from one another until the sensing finger wall 101 abuts the inner contact end 126A and deflects it toward the other resilient contact end 125A to abut the two together to make the contacts. The small flat leaf spring contact strips 125 and 126 may be suitably secured by rivets 127 and 128, respectively, to the reel body 47. Leads 129 and 130 are secured to their respective contact strips by the rivets and are sufficiently long to allow movement of the reel 43 through almost 360°.

The preferred housing 55 is made inexpensively of molded plastic to encapsulate the sensing element 70, solenoid means 73, reel body 47, reel spring 61, and enabling electrical contacts 31. The rugged small housing may be easily hidden with the seat and suitably protected against damage. The electric leads may be encased in an armored cable to prevent "jumping" thereof.

The timer means 24 may include a conventional timing motor such as an electrical motor timer which is operable by operation of the ignition circuit to begin its timing cycle. On the other hand, the timer means 24 may be a solid state electronic timer of conventional design. If the weight parity is not achieved and the person sits on the seat for the predetermined period of time, e.g., five minutes, then timer means contact 98 is closed by the timing motor allowing the ignition means 16 to operate the starter motor by anyone having the key or having jumped the ignition switch. Of course, the audio alarm 27 may be sounding during this period if it has been included in the system. In the preferred system, the driver lifts his weight from the seat to allow the reel to return to its original reset position to place the system in condition for measuring the driver's weight and for reuse by the driver.

In a further embodiment of the invention, the antitheft system of the present invention is disclosed for use with a typical locked door 200 for a facility such as a room or building. For instance, the door 200 may be provided with a conventional lock 201 operable by a key 202 to move a bolt 203 to lock or unlock the door in the conventional manner. When it is desired to provide additional protection so that the lock 201 may be operated only by a person having substantially the same weight as the person who last locked the door, the person will stand on a pad or mat 205, while locking the door. The weight measuring means 210, which may be of the same construction as described above including the reel 43, will have been deflected. The person will then operate an activating means 207 having a pushbutton switch 208 connected by leads 210 to operate the solenoid means 73 to shift the sensing element 70 to deactuate it from the reel body 47. As the person leaves the pad 205, the reel body 43 and elongated member 41 will again restore to the zero or set position until the next person steps on the pad. Preferably, the operation of the solenoid means 73 for the weight storing also operates another latching device 209 which having an additional latch 220 or a blocking member for the latch bolt 203 prevents opening of the door, unless there is a matching of the weight as well as the use of the key 202.

A subsequent stepping upon the pad 205 by a person trying to gain access to the facility through the door causes another weight measuring operation with operation of a suitable contact which operates the solenoid means 73 of the weight matching means to attempt to insert the sensing element fingers 72 in the openings 74 in the reel body 47. If substantial weight parity is not achieved, then the solenoid 209 for the latch 220 remains operative and entry will be denied even though the lock 201 may be picked or a key 202 is used to open the locks 201. Only when the sensing element operates the contacts 31 of the enabling means 22 will the circuit for the latch solenoid 209 be closed to remove the latch or blocking member 220 so that a person using the key 202 in the lock 201 is able to open the door.

As an aid to a better understanding of the invention, a brief description of the operation of the illustrated apparatus and method will now be given. Assuming that the driver is already seated in the vehicle with the ignition key switch 17 closed, the operator will then operate the activating means switch 14 which causes the solenoid means 73 to be energized to shift the sensing element 70 from its clutched position with the reel to its detented position with the locking ring 81. The detented angular position of the locking ring thus stores the weight information. When the driver leaves the car seat, the reel 43 will automatically be turned by its spring 60 to reset at the zero position in which the stop projection 99 on the reel abuts a stationary stop projection 100 on the housing 55. The solenoid 73 is operated only momentarily by the activating switch. Further operations of the activating switch will have no effect as the solenoid plunger will already be in its right-hand or weight storing position.

Assuming a thief sits in the driver's seat behind the driver's wheel, his different weight and/or physiognomy will deflect the seat to a different extent, but still will allow the reel 43 to turn and wind the elongated member 41 on the reel 43 which will be at an angular position where the opening 74 in the reel is out of alignment with the sensing finger 72. Therefore, when the ignition key lock contacts 17 are closed by the thief, the solenoid is energized for a weight comparing operation and it is shifted (by the ignition key contact circuit) and its solenoid plunger 95 is shifted to the left, as viewed in FIG. 3. The grounding condition will prevail as the grounding contact 105 hits the grounding ring 107 which is used to operate the timer means 24 and which may be used to set off an audio alarm 27. In any event, the detenting operation will be broken as the solenoid plunger 95 continues to push the sensing element 70 to the left and to tilt the sensing element by pivoting the same about the contact 105. The separating of the serrated surfaces allows the torsion spring 97 to immediately turn the sensing element 70 to the reset position at which the sensing finger 72 abuts the stop 98 on the housing to arrest further turning of the sensing element. The timer means 24 having been operated with closure of contacts 105 and 107 begins timing out. The enabling circuit remains open at its contacts 25. The thief will not stay with the vehicle particularly if an audio alarm has sounded and the duration of the timing cycle is unknown to him.

Once the thief leaves the vehicle seat, the reel will automatically rewind under the influence of its spiral spring 60 to the reset position, the stop projection 99 on the reel 43 abutting the stop projection 100 on the housing.

On the other hand, if the person who set the activating switch and whose weight information has been stored returns to the vehicle before a thief has tried to defeat the system and sits on the seat and deflects the same, the reel 43 will be turned by the biasing spring 60 to the position in which the opening 74 is aligned opposite the sensing finger 72. Then, operation of the ignition circuit contact 17 will operate the solenoid 73 to cause its plunger 75 to shift for weight sensing (to the left in FIG. 3) and to insert the sensing finger 72 through the aligned opening 74 and close the enabling circuit contacts 25 which allows operation of the starter motor 20. With release of the ignition key, the solenoid plunger will remain in its leftward position maintaining the clutched connection of the sensing element 70 and the reel body 47 until such time as the solenoid is next activated by the activating switch 14 to shift the same in the opposite direction to store the weight.

From the foregoing, it will be seen that the present invention provides an authorized usage system which is highly personalized to the person who activates the system for measuring his weight and then requiring a matching weight before access can be gained to the facility. Usually, the matched weight will be in combination with the use of a key or other unlatching device before access is allowed. On the other hand, the matched weight may be obtained merely by standing on a pad and authorized access allowed without the use of a key or other kind of unlatching device. The preferred system disclosed in this patent application has an electromechanical system which can be manufactured at quite a low cost for use with original equipment of automobiles. It is contemplated that other electronic or more solid state systems may be used for the weight measuring, storing and comparing steps rather than the electromechanical device disclosed herein. It is intended that any such electronic devices fall within the purview of the appended claims.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An antitheft method for a vehicle having a deflection storing means, a key operated ignition lock and an ignition circuit for operating a starting motor for the vehicle's internal combustion engine, said method comprising the steps of: providing a selectively operable activation switch means for rendering an antitheft system operative, measuring the deflection of a person seated in the driver's seat of the vehicle, storing of the deflection measurement in the storing means of the vehicle subsequent to activation of the antitheft system by operation of said switch means, retaining said deflection measurement even though the person leaves the vehicle seat, measuring the deflection of a person next seated in the driver's seat and next attempting to use a key or other means to operate the ignition lock, comparing the stored deflection measurement with the newly measured deflection measurement for substantial parity therebetween immediately after the operation of the ignition key to operate the ignition lock, and enabling operation of the ignition circuit and the starter motor upon a substantial parity of said deflection measurements.

2. An apparatus for protecting against the theft of a vehicle having a key operated ignition lock and an ignition circuit for operating a starting motor for the vehicle's internal combustion engine, said apparatus comprising a selectively operable activation switch means for rendering an antitheft system operative, means for measuring a deflection measurement of a person seated in the driver's seat, means in said vehicle for storing the deflected measurement in the vehicle subsequent to activation of the antitheft system and for retaining said deflected measurement even though the person leaves the vehicle seat, said measuring means measuring the deflection of a person next seated in the driver's seat, switch means operable by the person next seated and operating the same to institute an immediate comparison of the deflection of the person seated with the deflection information previously stored, means operable by said last mentioned switch means for comparing the stored deflection measurement with the newly measured deflection measurement for substantial parity therebetween immediately after operation of said last mentioned switch means, and means for enabling operation of the ignition circuit and the starter motor upon a substantial parity of said deflection measurement.

3. A system for denying access by a person to a locked facility, said system comprising a locking means for locking the facility, weight measuring means for measuring and providing weight information about a person operating the locking means, means for storing the weight information obtained by said weight measuring means and for retaining said weight information even though the person leaves said facility, a weight comparing means operable upon a subsequent operation of said weight measuring means to compare the stored weight information with a newly measured weight information for substantial parity thereof, and means operable by said weight comparing means upon finding of a substantial parity of said weights to enable operation of said locking means and access to the facility by a person whose weight has been newly measured, and a timing means responsive to said weight comparing means for allowing access to the facility by operating the locking means after a predetermined period of time by persons having a weight other than that stored.

4. A system for denying access to a facility by a person having a weight different from that of the weight of the person locking the facility, said system comprising a locking means operable by a key by a person at a predetermined position, a weight measuring reel means including an elongated coiled member and a reel therefor at said predetermined position with the elongated coiled member being displaced by the weight of the person using the key, weight storing means being set by the first displacement of the weight sensitive reel means even though the person leaves said predetermined position, said weight measuring means being operable by other persons attempting to pick the lock or to use the key to measure their weights for comparison with the first weight, weight comparing means for comparing the first weight stored with the subsequent weights for substantial weight parity, and enabling means operable by said weight comparing means upon a weight parity to allow operation of said locking means and access to said facility, an activating means for activating said weight storing means to store the first weight measured after activation of the system, and a timing means responsive to said weight comparing means for operating said enabling means after a predetermined period of time to allow operation of said locking means by persons having a weight other than the stored weight.

5. An antitheft method for a vehicle having a key operated ignition lock and an ignition circuit for operating a starting motor for the vehicle's internal combustion engine, said method comprising the steps of: providing a selectively operable activation switch means for rendering an antitheft system operative, measuring weight information about a person seated in the driver's seat, storing the weight information subsequent to activation of the antitheft system, retaining said weight information even though the person leaves the vehicle seat, measuring the weight of a person subsequently seated in the driver's seat and attempting to use a key or other means to operate the ignition lock, comparing the stored weight information with the newly measured weight information for substantial parity therebetween, and enabling operation of the ignition circuit and the starter motor upon a substantial parity of said weights, starting a timing period each time a person sits in the driver's seat of the vehicle and operates the ignition key after the antitheft system has been activated, and timing a predetermined period of time after which a timing means responsive to said weight comparing means operates an enabling means to enable operation of the ignition circuit and starter motor despite a lack of parity between the stored weight information with the newly measured weight information.

* * * * *